(12) United States Patent
Tomihashi et al.

(10) Patent No.: US 6,734,236 B1
(45) Date of Patent: May 11, 2004

(54) FLUORINE-CONTAINING RESIN POWDER COATING COMPOSITION

(75) Inventors: Nobuyuki Tomihashi, Settsu (JP); Koichiro Ogita, Settsu (JP); Toshio Miyatani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/937,705

(22) PCT Filed: Mar. 23, 2000

(86) PCT No.: PCT/JP00/01756

§ 371 (c)(1),
(2), (4) Date: Oct. 1, 2001

(87) PCT Pub. No.: WO00/58414

PCT Pub. Date: Oct. 5, 2000

(30) Foreign Application Priority Data

Mar. 29, 1999 (JP) .............................. 11-086898

(51) Int. Cl.$^7$ ............................ C08K 5/34; C08K 5/36; C08K 3/22; C08K 9/02
(52) U.S. Cl. ........................... 524/93; 524/94; 524/431; 524/904; 523/202; 523/212; 428/424.6
(58) Field of Search ................................ 523/212, 202; 524/431, 463, 43, 94; 428/424.6

(56) References Cited

U.S. PATENT DOCUMENTS

| 3,941,603 A | | 3/1976 | Schmidt ..................... 106/300 |
| 5,879,746 A | * | 3/1999 | Tomihashi et al. |
| 6,107,390 A | * | 8/2000 | Maeda et al. |

FOREIGN PATENT DOCUMENTS

| EP | 0 006 493 | 1/1980 |
| EP | 0 007 514 | 2/1980 |
| EP | 0 226 118 | 6/1987 |
| JP | 52-109351 | 9/1977 |
| JP | 55-16058 | 2/1980 |
| JP | 60-155946 | 10/1985 |
| JP | 63-6078 | 1/1988 |
| JP | 8-259743 | 10/1996 |

* cited by examiner

*Primary Examiner*—Tae H. Yoon
(74) *Attorney, Agent, or Firm*—Sughrue Mion, PLLC

(57) ABSTRACT

To provide a fluorine-containing resin powder coating composition giving a fluorine containing resin coating film having a high whiteness, and various articles having on an outer surface thereof a coating of which has a high whiteness and can be produced by applying the fluorine-containing resin powder coating composition. The fluorine-containing resin powder coating composition is subjected To baking at 300° C. or more, and the fluorine-containing resin composition for forming the coating film comprises surface-treated rutile titanium oxide particles as a whitening agent.

19 Claims, No Drawings

FLUORINE-CONTAINING RESIN POWDER COATING COMPOSITION

TECHNICAL FIELD

The present invention relates to a fluorine-containing resin powder coating composition which gives a fluorine-containing resin coating film having a high whiteness and to various articles having the fluorine-containing resin coating film.

BACKGROUND ART

Fluorine-containing resin coatings have been used widely for coating of an outer surface of chemical equipment and parts of a plant of chemical industry such as a reaction tank, reservoir tank, reaction tower, inner lining of piping, agitator and processing roll by making the best use of excellent properties of a fluorine-containing resin such as solvent resistance, heat resistance, non-sticking property, chemical resistance and electrically insulating property.

The fluorine-containing resin powder coating composition is subjected to baking at high temperature, particularly at 300° C. or more after the coating, and therefore foaming arises easily due to thermal deterioration of the fluorine-containing resin, and addition of a thermal stabilizer is essential.

The addition of a thermal stabilizer can inhibit the deterioration of the fluorine-containing resin considerably. However since the thermal stabilizer is deteriorated, there is a problem that the fluorine-containing resin coating film which is originally transparent and white is subject to a change in color into brown or black or non-uniformity of color after the baking due to a residue of the deteriorated stabilizer. Thermal deterioration of the fluorine-containing resin is also considered as a cause for the color change.

On the other hand, in the fields of medicines, foods and medical hygiene, from a point that staining of tanks for synthesis and storage of chemical substances is difficult to recognize when a dark coating is used and also from the viewpoint of appearance and cleanliness, a coating color is demanded to be as approximate to white as possible.

A usual method of making a color of coating film white is a method of incorporating a white pigment for coating. Examples of known white pigment are titanium oxide, calcium carbonate, zinc oxide, barium sulfate, and the like. The inventors of the present invention have made experiments and as a result in case of general-purpose white pigments for coating, non-uniformity of color arose and a satisfactory coating film could not be formed.

An another approach is a method of changing a thermal stabilizer. However even in this approach, a color change could not be inhibited only by changing the thermal stabilizer. Moreover the addition of the white pigment for coating still causes non-uniformity of color.

An object of the present invention is to provide a fluorine-containing resin powder coating composition which gives a fluorine-containing resin coating film having a high whiteness.

Another object of the present invention is to provide various articles having on an outer surface thereof a coating film which has a high whiteness and is obtained by applying the fluorine-containing resin powder coating composition.

DISCLOSURE OF INVENTION

Namely the present invention relates to the fluorine-containing resin powder coating composition to be subjected to baking at 300° C. or more, in which the fluorine-containing resin composition for forming a coating film contains surface-treated rutile titanium oxide particles as a whitening agent.

In the present invention it is preferable that the fluorine-containing resin composition for forming a coating film comprises a fluorine-containing resin, a thermal stabilizer and surface-treated rutile titanium oxide particles and that the fluorine-containing resin is a perfluoro resin, particularly a melt-moldable perfluoro resin and the thermal stabilizer has a melting point of not less than 70° C.

Further the present invention relates to the coating film which is obtained by applying the above-mentioned coating composition of the present invention and baking at 300° C. or more and has a whiteness of 60 or more and relates to the articles having the coating film on a surface thereof.

BEST MODE FOR CARRYING OUT THE INVENTION

The fluorine-containing resin to be used for the fluorine-containing resin composition for forming a coating film of the present invention is one which can stand baking at 300° C. The fluorine-containing resin may be a perfluoro resin or a non-perfluoro resin such as vinylidene fluoride copolymer, ethylene-tetrafluoroethylene copolymer or ethylene-chlorotrifluoroethylene copolymer. From the viewpoint of excellent heat resistance, solvent resistance, non-sticking property, chemical resistance and electrically insulating property, the perfluoro resin is preferable. Also among the perfluoro resins, melt-moldable perfluoro resins are preferred to polytetrafluoroethylene (PTFE) which is difficult to be melt-molded, from the point that a film forming property thereof is excellent and pin hole is difficult to arise.

Examples of the preferred melt-moldable perfluoro resin are tetrafluoroethylene (TFE) copolymers, for instance, copolymers of TFE with at least one of perfluoro(alkyl vinyl ethers) (PAVE) and hexafluoropropylene (HFP). Particularly TFE, PAVE and/or HFP copolymers, concretely TFE/PAVE copolymer (PFA), TFE/HFP copolymer (FEP) and TFE/PAVE/HFP copolymer are preferred.

Examples of PAVE are one or more of perfluoro(methyl vinyl ether) (PMVE), perfluoro(ethyl vinyl ether) (PEVE), perfluoro(propyl vinyl ether) (PPVE), and the like. Particularly PPVE is preferable.

One of the features of the present invention is that the fluorine-containing resin composition for forming a coating film comprises surface-treated rutile titanium oxide particles as a whitening agent in addition to the fluorine-containing resin.

It is necessary that titanium oxide to be used in the present invention is surface-treated and a crystalline form thereof is of rutile type. As shown in Comparative Examples mentioned hereinbelow, in case of un-treated titanium oxide which is a general-purpose white pigment for coating, non-uniformity of color arises, and also even in case of anatase titanium-oxide which is titanium oxide having another crystalline form, non-uniformity of color occurs.

It is preferable that a surface-treating agent for rutile titanium oxide is one comprising aluminum oxide and/or silicon oxide, more preferably one containing silicon oxide in a larger amount.

An average particle size of titanium oxide is not limited particularly, and is, for example, from about 0.1 $\mu$m to about 1.0 $\mu$m which is a size of commercially available titanium oxide.

Examples of the surface-treated rutile titanium oxide to be used preferably in the present invention are, for instance, Tipaque (registered trademark) CR-90, CR-95 and CR-97 available from Ishihara Sangyo Kaisha, Limited; Titanix (registered trademark) R-805 available from TAYCA CORPORATION; Ti-Pure (registered trademark) R-960 and R-902 available from Du Pont de Nemour E.I. & Co. Inc.; and the like. Also rutile titanium oxides surface-treated to the same extent as in those surface-treated rutile titanium oxides can be used preferably.

An amount of the surface-treated rutile titanium oxide is from 0.1 to 10 parts by weight (hereinafter referred to as "apart"), preferably 0.5 to 10 parts, further preferably 1 to 5 parts based on 100 parts of the fluorine-containing resin. When less than 0.1 part, a desired whiteness cannot be given to a coating film, and when more than 20 parts, non-sticking property and corrosion resistance of the fluorine-containing resin coating film are lowered.

To the fluorine-containing resin powder coating composition of the present invention is blended a thermal stabilizer. While various known thermal stabilizers can be used, when dry-blending each component for preparing a powder coating composition, since a temperature of the mixture becomes 60° C. or more, usually 70° C. or more, thermal stabilizers having a melting point of 70° C. or more, preferably. 80° C. or more are used. This is a characteristic point of the powder coating composition with respect to the thermal stabilizer.

Examples of the preferable thermal stabilizer are those comprising an organosulfurous thermal stabilizer, amine thermal stabilizer and/or metal powder thermal stabilizer.

Preferable combinations are a combination use of the organosulfurous thermal stabilizer and the amine thermal stabilizer and a combination use of the organosulfurous thermal stabilizer, the amine thermal stabilizer and the metal powder thermal stabilizer.

Examples of the organosulfurous thermal stabilizer are, for instance, one or more of benzimidazole mercaptan compounds represented by the formula (I):

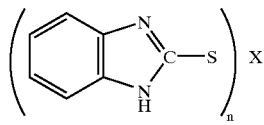

wherein X is H, Zn, Sn or Cd, n is an integer of 1 to 4, benzothiazole mercaptan compounds represented by the formula (II):

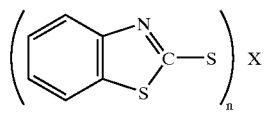

wherein X is H, Zn, Sn or Cd, n is an integer of 1 to 4, thiocarbamic acids represented by the formula (III):

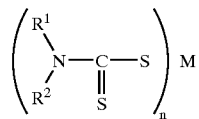

wherein each of $R^1$ and $R^2$ is an aryl group or alkyl group having 2 to 16 carbon atoms, M is Zn, Sn, Cd or Cu, n is an integer of 1 to 4, or salts thereof, thiuram monosulfides represented by the formula (IV):

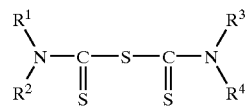

wherein each of $R^1$, $R^2$, $R^3$ and $R^4$ is an aryl group or alkyl group having 2 to 16 carbon atoms, thiuram disulfides represented by the formula (V):

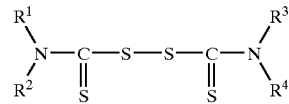

wherein each of $R^1$, $R^2$, $R^3$ and $R^4$ is an aryl group or alkyl group having 2 to 16 carbon atoms, and organotin mercaptide compounds represented by the formula (VI):

wherein Y is a mercaptan residue, $R^1$ and $R^2$ are the same or different and each is an aryl group or alkyl group having 2 to 16 carbon atoms.

Examples thereof are, for instance, benzimidazolemercaptan compounds represented by the formula (I) such as 2-mercaptobenzothiazole and 2-mercaptobenzimidazole; benzothiazole mercaptan compounds represented by the formula (II) such as a zinc salt of 2-mercaptobenzothiazole; thiocarbamic acids represented by the formula (III) or salts thereof such as zinc ethylphenyldithiocarbamate VII and zinc dibutyldithiocarbarnate; thiuram monosulfides represented by the formula (IV) such as tetra-methyl-thiuram monosulfide; thiuram is disulfides represented by the formula (V) such as tetra-methyl-thiuram disulfide; and organotin mercaptide compounds represented by the formula (VI) such as dibutyltin maleate and dibutyltin mercaptide.

Among them, benzothiazole mercaptan compounds are preferable from the viewpoint of thermal stabilizing effect and chemical resistance. Particularly a zinc salt of 2-mercaptobenzothiazole is preferable.

With respect to the amine thermal stabilizer, aromatic amine thermal stabilizers having three or more benzene rings, preferably 3 or 4 benzene rings are preferable, and further those having a melting point of not less than 80° C. are preferable. The aromatic amine thermal stabilizers function to enhance a thermal stabilizing effect particularly when used together with the organosulfurous thermal stabilizer due to a difference in a decomposition temperature.

Examples of the aromatic amine thermal stabilizer are, for instance, 4,4-bis(α,α-dimethylbenzyl)diphenylamine, dinaphthylamine, phenyl-α-naphthylamine, phenyl-β-naphthylamine, diphenyl-p-phenylenediamine, phenylcyclohexyl-p-phenylenediamine, aldol-α-naphthylamine, diphenylamine, and the like. Particularly 4,4-bis(α,α-dimethylbenzyl)diphenylamine is preferable.

Examples of the metal powder thermal stabilizer are one or more of cobalt powder, iron powder, zinc powder, tin powder and copper powder. A combination use of the metal powder thermal stabilizer with the above-mentioned organosulfurous thermal stabilizer and amine thermal stabilizer is more preferable than a single use thereof.

A proportion in a weight ratio of the organosulfurous thermal stabilizer, amine thermal stabilizer and metal powder thermal stabilizer is 50 to 100/0 to 50/0 to 50, preferably 50 to 99/1 to 50/0 to 30.

An adding amount of the thermal stabilizer is from 0.1 to 3 parts, preferably 0.5 to, 3.0 parts based on 100 parts of the fluorine-containing resin. When less than 0.1 part, a sufficient thermal stabilizing effect cannot be obtained, and when more than 3 parts, a whiteness of an obtained coating film is lowered.

A particularly preferable combination of thermal stabilizers is the organosulfurous thermal stabilizer represented by the formula (II) and the aromatic amine thermal stabilizer having three or more benzene rings and a melting point of 80° C. or more. More concretely preferable is a combination of a zinc salt of 2-mercaptobenzothiazole and 4,4-bis($\alpha$,$\alpha$-dimethylbenzyl)diphenylamine desirably in a weight ratio of 50/50 to 99/1.

To the fluorine-containing resin powder coating composition of the present invention may be blended various additives for powder coating as far as a whiteness of an obtained coating film is not lowered remarkably. Examples of the additives are, for instance, an antistatic agent such as a carbon fiber, titanic acid whisker or carbon fluoride, a reinforcing agent such as a glass fiber or mica, and the like.

The powder coating composition of the present invention can be prepared by mixing in the same manner as in a usual method. For example, any of usual mixers such as a sample mill, V-blender, cone blender and ribbon mixer and usual pulverizer can be used without any specific limitations. Also the composition can be used in the form of liquid or slurry obtained by dispersing the composition into an organic medium or aqueous medium.

An average particle size of the obtained powder coating composition is within a range which has been used so far, for example, from 10 to 500 $\mu$m, preferably about 20 $\mu$m to about 300 $\mu$m.

Also the same coating methods as usual, for example, static coating methods such as spray coating and fluidized bed coating, a method of lining by rotation molding, and the like can be used optionally.

After coating, the coating film is subjected to baking at a temperature of 300° C. or more, usually from 300° to 400° C. A thickness of the formed coating film is within a range of from 30 to 5,000 $\mu$m. Concretely the coating thickness may be selected optionally depending on purpose and application thereof. The composition may be coated thick by one coat or may be coated plural times by forming 30 to 150 $\mu$m thick coating film by one coat. When coating plural times, it is preferable that the baking is carried out for each coat from the viewpoint of adjusting a coating thickness.

A substrate to be coated is not limited as far as it can be coated with conventional fluorine-containing resin powder coating compositions. Non-restricted examples thereof are, for instance, metallic substrates such as aluminum, stainless steel, Ni alloy and metal die cast substrates; ceramic substrates such as glass and insulator substrates; and the like.

It is effective to previously surface-treat a surface of the substrate to be coated by sand blasting treatment, oxide film coating, or the like depending on kind of a substrate. Also a primer layer may be formed on the substrate. Particularly by forming the primary layer, non-uniformity of a color of the obtained coating film can be inhibited further.

A coating film which is rich in white and has a whiteness (L value) of 60 or more can be obtained by using the fluorine-containing resin powder coating composition of the present invention. Further a coating film having a whiteness of 70 or more, further 80 or more can be formed by increasing an amount of the above-mentioned preferable surface-treated rutile titanium oxide and by using the, above-mentioned preferable combinations of thermal stabilizers.

The present invention also relates to the articles having a fluorine-containing resin coating film having such a high whiteness on its surface. Non-restricted examples of the articles which are obtained by using the coating film of the present invention are, for instance, chemical equipment and parts thereof contacting a chemical substance such as a reaction tank, storage tank, pipe, agitator, roll, valve, reaction tower and centrifugal dehydrator.

The articles of the present invention are suitable particularly for uses in the fields of medicines, foods and medical hygiene because a whiteness thereof is high and detection of stain is easy.

The present invention is then explained by means of examples, but is not limited thereto.

EXAMPLE 1

An agitator (SPEED KNEADER available from Showa Engineering Kabushiki Kaisha) having a 50-liter agitation chamber equipped with four agitation blades was charged with 10 kg of FEP powder coating composition (NC 1500 available from DAIKIN INDUSTRIES, LTD.) having an average particle size of 60 $\mu$m and then 0.2 kg of a mixture of 4,4-bis($\alpha$,$\alpha$-dimethylbenzyl)diphenylawmne, zinc salt of 2-mercaptobenzothiazole and cobalt powder in a ratio of 3:3:2 (weight ratio) (stabilizer I in Table 1) and 0.5 kg of surface-treated rutile titanium oxide (Tipaque CR-93 available from Ishihara Sangyo Kaisha, Limited and surface-treated with a mixture of aluminum oxide/silicon oxide in a weight ratio of 2 to 5/3 to 5), followed by dry-blending at 1,500 rpm for 30 minutes to give a FEP powder coating composition.

The FEP powder coating composition was applied on an aluminum panel and iron panel in the following manner and then subjected to baking. A whiteness (L value), non-uniformity of color and foaming of the obtained coating film were evaluated. The results are shown in Table 1.

(Whiteness)

The power coating composition is applied on an aluminum panel (100×100×1.5 mm) provided with a primer layer (EK1959DGN available from DAIKIN INDUSTRIES, LTD.) on its surface by electrostatic coating at an applied voltage of 40 kV with an electrostatic coating machine (GX3300 available from Onoda Cement Kabushiki Kaisha) so that a coating thickness after baking becomes about 100 $\mu$m. After the coating, the baking is carried out at 350° C. for 30 minutes in an electric oven. Then further the coating and baking are repeated two times (baking conditions at the third baking: 340° C.×60 minutes) to produce a test panel having a fluorine-containing resin coating film in a total coating thickness of about 250 to 300 $\mu$m. A whiteness (L value) of the coating film is measured with SM color computer (model SM-7) available from Suga Shikenki Kabushiki Kaisha.

(Non-uniformity of color)

The coating film of test panel produced for measuring the whiteness is observed with naked eyes and evaluated according to the following criteria.

A. N non-uniformity of color.
B: Slight non-uniformity of color.
C: Apparent non-uniformity of color.

(Degree of Foaming)

A primer (EK1083GB available from DAIKIN INDUSTRIES, LTD.) is applied on an iron panel subjected to sand blasting, followed by drying at 90° C. for 10 minutes and then baking at 380° C. for 10 minutes. Further a primer (EK1883GB available from DAIKIN INDUSTRIES, LTD.) is applied thereon, dried and baked. A rectangular molding form of 10×10 cm is placed on the primer layer and the powder coating composition is filled in the molding form so that a coating thickness becomes about 2,000 μm after the baking. After the molding form is removed carefully, the baking is carried out at 340° C. for 14 hours in an electric oven. Then a foaming state of the coating film after the baking is observed with naked eyes and evaluated according to the following criteria.

A: No foaming is recognized.
B: Slight foaming is recognized.
C: Foaming is recognized on the whole surface.

EXAMPLES 2 TO 6

Fluorine-containing resin powder coating compositions were prepared in the same manner as in Example 1 except that kind and amount of the thermal stabilizer and an amount of rutile titanium oxide were changed as shown in Table 1, and a whiteness (L value), non-uniformity of color and a degree of foaming were evaluated in the same manner as in Example 1. The results are shown in Table 1.

A thermal stabilizer used in Examples 5 and 6 was a mixture of 4,4-bis(α,α-dimethylbenzyl)diphenylamine and a zinc salt of 2-mercaptobenzothiazole in a ratio of 1:1 (weight ratio) (Stabilizer II in Table 1).

COMPARATIVE EXAMPLES 1 TO 6

Fluorine-containing resin powder coating compositions were prepared in the same manner as in Example 1 except that kind and amount of the thermal stabilizer and an amount of Futile titanium oxide were changed as shown in Table 1, and a whiteness (L value), non-uniformity of color and a degree of foaming were evaluated in the same manner as in Example 1. The results are shown in Table 1.

In Comparative Examples 1 and 2, no thermal stabilizer was used, and in Comparative Examples 3 and 4, a mixture of a zinc salt of 2-mercaptobenzothiazole and di-β-naphthyl-p-phenylenediamine in a ratio of 1:1 (weight ratio) (Stabilizer III in Table 1) was used as a thermal stabilizer. Also in Comparative Example 5, rutile titanium oxide not subjected to surface treatment (FR-22 available from Furukawa Kogyo Kabushiki Kaisha) was used as a whitening agent, and in Comparative Example 6; anatase titanium oxide not subjected to surface treatment (FA-65 available from Furukawa Kogyo Kabushiki Kaisha) was used.

EXAMPLES 7 TO 8

Fluorine-containing resin powder coating compositions were prepared in the same manner as in Example 1 except that PFA powder coating composition (AC5500 available from DAIKIN INDUSTRIES, LTD.) was used as a fluorine-containing resin and a thermal stabilizer and whitening agent shown in Table 1 were used, and a whiteness (L value), non-uniformity of color and a degree of foaming were evaluated in the same manner as in Example 1. The results are shown in Table 1.

COMPARATIVE EXAMPLE 7

A fluorine-containing resin powder coating composition was prepared in the same manner askin Example 7 except that kind and amount of the thermal stabilizer and an amount of Futile titanium oxide were changed as shown in Table 1, and a whiteness (L value), non-uniformity of color and a degree of foaming were evaluated in the same manner as in Example 7. The results are shown in Table 1.

TABLE 1

|  | Fluorine-containing resin | Thermal stabilizer | | Whitening agent | | Whiteness (L value) | Non-uniformity of color | Degree of foaming |
| --- | --- | --- | --- | --- | --- | --- | --- | --- |
|  |  | Kind | Amount (part by weight) | Kind | Amount (part by weight) |  |  |  |
| Ex. 1 | FEP | I | 2 | CR-93 | 5 | 77.7 | A | A |
| Ex. 2 | FEP | I | 2 | CR-93 | 3.5 | 72.8 | A | A |
| Ex. 3 | FEP | I | 2 | CR-93 | 2.5 | 68.1 | A | A |
| Ex. 4 | FEP | I | 1 | CR-93 | 2.5 | 76.5 | A | B |
| Ex. 5 | FEP | II | 2 | CR-93 | 5 | 80.8 | A | A |
| Ex. 6 | FEP | II | 2 | CR-93 | 3.5 | 78.1 | A | A |
| Ex. 7 | PFA | I | 2 | CR-93 | 3.5 | 73.0 | A | A |
| Ex. 8 | PFA | II | 2 | CR-93 | 3.5 | 77.3 | A | A |
| Com. Ex. 1 | FEP | — | — | CR-93 | 2.5 | 74.4 | C | C |
| Com. Ex. 2 | FEP | — | — | CR-93 | 0.5 | 76.2 | B | C |
| Com. Ex. 3 | FEP | III | 2 | CR-93 | 5 | 56.6 | A | A |
| Com. Ex. 4 | FEP | III | 0.5 | CR-93 | 5 | 59.1 | A | C |
| Com. Ex. 5 | FEP | I | 2 | FR-22 | 2.5 | 60.2 | B | C |
| Com. Ex. 6 | FEP | I | 2 | FA-65 | 5 | 58.9 | B | C |
| Com. Ex. 7 | PFA | III | 2 | CR-93 | 5 | 53.3 | A | A |

Industrial Applicability

According to the present invention, a fluorine-containing resin powder coating composition giving a fluorine-containing resin coating film having a high whiteness can be provided, and various articles which can be produced by applying the fluorine-containing resin powder coating composition and have a coating film having a high whiteness on its outer surface can be provided.

What is claimed is:

1. A fluorine-containing resin powder coating composition to be subjected to baking at 300C. or more, in which the fluorine-containing resin composition for forming a coating film comprises a fluorine-containing resin, a thermal stabilizer and surface-treated rutile titanium oxide particles as a whitening agent, and said powder coating composition gives a baked coating film having a whiteness of 60 or more after baking at 300° C. or more.

2. The coating composition of claim 1, wherein the surface-treated rutile titanium oxide particles are rutile titanium oxide surface-treated with aluminum oxide and/or silicon oxide.

3. The coating composition of claim 1, wherein the fluorine-containing resin composition for forming a coating film comprises 0.3 to 3 parts by weight of the thermal stabilizer and 0.5 to 10 parts by weight of the surface-treated rutile titanium oxide particles based on 100 parts by weight of the fluorine-containing resin.

4. A coating film which is a fluorine-containing resin coating film obtained by applying the powder coating composition of claim 1 and baking at 300° C. or more and has a whiteness of 60 or more.

5. An article having the coating film of claim 4 on a surface thereof.

6. A tank for medicines, foods and medical hygiene, which has the coating film of claim 4 on an inner surface thereof.

7. A chemical equipment and parts thereof having the coating film of claim 4 on an outer surface thereof.

8. The coating composition of claim 1, wherein the fluorine-containing resin is a melt-moldable perfluoro resin.

9. The coating composition of claim 8, wherein the perfluoro resin is a copolymer of tetrafluoroethylene, perfluoro(alkyl vinyl ether) and/or hexafluoropropylene.

10. The coating composition of claim 1, wherein the thermal stabilizer has a melting point of not less than 70° C. and comprises an organosulfurous thermal stabilizer, amine thermal stabilizer and/or metal powder thermal stabilizer.

11. The coating composition of claim 10, wherein the organosulfurous thermal stabilizer and amine thermal stabilizer are used together or the organosulfurous thermal stabilizer, amine thermal stabilizer and metal powder thermal stabilizer are used together.

12. The coating composition of claim 10, wherein the organosulfurous thermal stabilizer is one or more of a benzimidazole mercaptan compound represented by the formula (I):

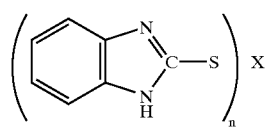

wherein X is H, Zn, Sn or Cd, n is an integer of 1 to 4, a benzothiazole mercaptan compound represented by formula (II):

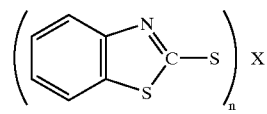

wherein X is H, Zn, Sn or Cd, n is an integer of 1 to 4, a thiocarbamic acid represented by the formula (III):

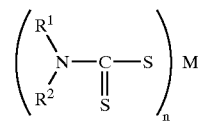

wherein $R^1$ and $R^2$ are an aryl group or alkyl group having 2 to 16 carbon atoms, M is Zn, Sn, Cd or Cu, n is an integer of 1 to 4, or a salt thereof, a thiuram monosulfide represented by the formula (IV):

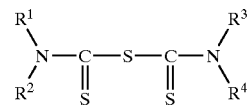

wherein $R^1$, $R^2$, $R^3$ and $R^4$ are an aryl group or alkyl group having 2 to 16 carbon atoms, a thiuram disulfide represented by the formula (V):

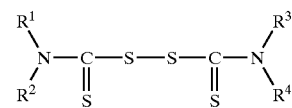

wherein $R^1$, $R^2$, $R^3$ and $R^4$ are an aryl group or alkyl group having 2 to 16 carbon atoms, and an organotin mercaptide compound represented by the formula (VI):

wherein Y is a mercaptan residue, $R^1$ and $R^2$ are the same or different and each is an aryl group or alkyl group having 2 to 16 carbon atoms.

13. The coating composition of claim 12, wherein the organosulfurous thermal stabilizer is a benzothiazole mercaptan compound represented by the formula (II).

14. The coating composition of claim 10, wherein the anmine thermal stabilizer is an aromatic amine thermal stabilizer having three or more benzene rings and having a melting point of not less than 80° C.

15. The coating composition of claim 14, wherein the aromatic amine thermal stabilizer is 4,4-bis(α,α-dimethylbenzyl)diphenylamine.

16. The coating composition of claim 10, wherein the metal powder thermal stabilizer is one or more of cobalt powder, iron powder, zinc powder, tin powder and copper powder.

17. The coating composition of claim 1, wherein the thermal stabilizer comprises an organosulfurous thermal stabilizer represented by the formula (II) and the aromatic amine thermal stabilizer having three or more benezene rings and a melting point of not less than 80C:

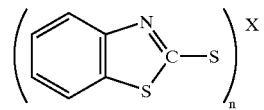
(II)

wherein X is H, Zn, Sn or Cd, n is an integer of 1 to 4.

18. The coating composition of claim 17, wherein the thermal stabilizer comprises a zinc salt of 2-mercaptobenzothiazole and 4,4-bis($\alpha,\alpha$-dimethylbenzyl) diphenylamine.

19. The coating composition of claim 17, wherein the thermal stabilizer comprises a zinc salt of 2-mercaptobenzothiazole and 4,4-bis($\alpha,\alpha$-dimethylbenzyl) diphenylamine in a weight ratio of 50/50 to 99/1.

* * * * *